United States Patent Office 3,829,310
Patented Aug. 13, 1974

3,829,310
HIGH SURFACE AREA VALVE
METAL POWDER
Tyler X. Mahy, Cambridge, Mass., assignor to
Norton Company, Newton, Mass.
Filed Apr. 30, 1973, Ser. No. 355,430
Int. Cl. B22f 5/00; C22b 51/00
U.S. Cl. 75—0.5 BB                    19 Claims

ABSTRACT OF THE DISCLOSURE

Solid particles of potassium fluotantalate are thoroughly dried and then coated with molten form sodium reducing agent, the coating being accomplished under temperature conditions controlled to remain below a temperature which will initiate the exothermic reduction reaction between these materials. After completion of the coating, the charge of premixed double salt and reducing agent is then heated through the temperature at which the exothermic reduction reaction is initiated. The initiation of the exothermic reaction causes a rapid temperature rise. Over 90% of the tantalum values of the salt charge are formed as elemental tantalum in particle form in the course of the exothermically driven temperature rise. The charge temperature is then stabilized in the range of 700°–1100° C., held for a time at this elevated temperature and then slowly cooled. During the temperature rise, tantalum metal particles nucleate throughout the mass of the premixed charge to form a coherent skeletal structure. This skeleton resists settling as the temperature is raised above the melting temperature of the salt mass, and a substantially homogeneous distribution of tantalum values throughout the reduction charge is formed and maintained. Tantalum metal particles, so formed are highly structured and can be separated as a high yield of high surface area-high capacitance tantalum powder.

BACKGROUND OF THE INVENTION

The present invention relates generally to metal powder production and more particularly to producing high surface area valve metal powders for sintering into capacitor electrodes in an economical, high yield process.

It is well known in the art to produce tantalum metal, for use in making capacitors, in powder forms of high purity through reduction of a purified potassium fluotantalate double salt ($K_2TaF_7$). This is done by adding any of various reducing agents including liquid sodium, magnesium and calcium to a melt of the salt to reduce the tantalum values therein. Separation of tantalum from the reacted mass by pulverizing and leaching to complete the metal powder production process. The practice is described in U.S. Pat. 2,950,185 to Hellier and Martin. Such processing, using sodium reducing agent, is in large scale production use today for producing high purity, high surface area tantalum powders. After classification to desired size cuts, the powders are usable in manufacture of sintered anodes for electrolytic capacitors. It is also known in connection with such processes to dilute the tantalum containing salt with alkali metal halide salt—including sodium chloride, potassium chloride, sodium bromide, potassium bromide, sodium iodide, potassium iodide, or mixtures thereof and the like—as taught in U.S. Pat. 2,994,603 to Greenberg and Foos. Increasing the structure of tantalum powders produced is desirable because more highly structured particles generally yield more surface area per unit of weight or volume and therefore more capacitance per unit of weight or volume in the usual case.

Related criteria for the tantalum powders so produced are high purity to avoid high leakage, good flow properties for reliable usage in pelleting dies and automated production equipment and good pelleting properties to permit pressing anodes at low green densities. Low sinter density after sinter-firing produces a capacitor anode with low dissipation factor in the finished capacitor. It is also necessary to take into account, in evaluating tantalum powders for capacitor use, the shrinkage characteristics of the powder. When the powders are pressed and sintered, they may have the vulnerability that they can only receive a very light sinter. Very high capacitance powders, generally made by taking finer and finer cuts of the powders, are particularly vulnerable in this regard. When sintered at 1800° C., they tend to undergo substantial shrinkage which leads to loss of capacitance, and worse, unpredictability as to electrical and mechanical properties. Yet, the high temperatures sinter is per se desired for its strengthening and cleaning benefits. Therefore it is desirable to provide a low shrinkage powder with high surface area.

To enhance the ability of the reduction run to afford such properties, several process changes have been utilized or proposed. Canadian Pat. No. 657,596 to Kelley, Rees and Mettler discloses critical temperatures for the sodium reduction of potassium fluotantalate to optimize crystalline tantalum production, which is less sensitive to oxygen pickup than amorphous, spongy metal. The art has also used thoroughly presintering of powders to increase the degree of natural agglomeration generally present in powder produced by sodium reduction, enhancing powder pelleting and flow properties.

British Pat. No. 694,921 of Titan Company, Inc., teaches the method of producing titanium metal by partially reducing titanium tetrachloride by forming 200 gram pellets thereof, dipping such pellets into a molten alkali metal bath to cause a reduction of the pellets to a lower chloride of titanium and then further pelletizing the partially-reacted lumps into smaller masses and putting them into a reducing agent bath to complete the reduction to free titanium metal.

Recently introduced commercial products include a very high capacitance powder which is highly structured and has good flow properties. The highly structured products are commercially sold under the trademarks SGV and SGVR, said products and trademarks being those of the Norton Company of Worcester, Mass., U.S.A. These products afford an enhanced utilization of tantalum values in a given salt source by producing high surface-high capacitance powders over a broader size range, in contrast to the prior state-of-the-art which involved taking finer size cuts of reduction product powder at lower yields.

It is an important object of the present invention to produce tantalum and other valve metal powders in the form of high surface area, high capacitance powders of adequate purity, flowability, and pelletability, in high yield.

It is a further object of the invention to produce such powders as a chemical reduction product uniformly distributed through the reduction charge, consistent with the preceding object.

It is a further object of the invention to produce valve metal powders which have improved pelleting properties, as measured by the ability to be pressed into a binderless compact having, in the case of tantalum, a green density of 5.0 grams per cc. with a crush strength of at least 100 pounds for a 1.8 gram compact and, in the case of other valve metals, a similarly low percent of theoretical density as green density.

It is a further object of the invention to produce a valve metal powder having a Scott Bulk Density of less than 35 grams per cubic inch (2.14 gm./cc.) and distinctly advantageously less than 25 grams per cubic inch (1.53 gm./cc.) consistent with an oxygen content of no greater than 0.2 weight percent and consistent with one or more of the preceding objects.

SUMMARY OF THE INVENTION

The objects of the invention are achieved by a reduction process in which the valve metal—preferably tantalum—is produced at uniformly dispersed locations throughout the main mass of a reduction charge and, due to processing conditions specifically adjusted to that end, remains in such location without substantial settling or segregation into distinct valve metal rich and valve metal poor layers. It is believed that the prior art processes of reduction do involve the initial formation of highly structured metal particles, with the structure being sacrificed at later stages of the reduction as the particles grow together in separate regions. The normal reduction process (whether utilizing stirring or omitting such stirring) is vulnerable to layering because the reaction takes place only after formation of a molten salt pool.

In accordance with the present invention, a salt source of the desired valve metal values is divided into solid particles of minus 10 mesh and these particles are thoroughly dried or otherwise treated to insure the substantial absence of alternative reactants to the reagents of the reduction reaction. The dried salt charge is coated with reducing agent applied in molten form. The salt and reducing agent are intimately mixed to provide coating throughout the salt charge. The coatings of adjacent particles are preferably in bridge contacting relation to form a matrix throughout the charge mass. The drying, coating and reduction can take place in a single vessel or can be done in separate vessels at separate locations.

The reduction charge is heated to cause a reduction reaction wherein the valve metal values are reduced from their salt source by the reducing agent. The reducing agent can be maintained molten from the time of introduction to the charge until initiation of the reaction or it can be solidified after coating the salt particles. Although it is preferred to complete addition of reducing agent to the salt charge and coating thereof prior to initiation of the reduction reaction, these steps can alternatively overlap. The reduction reaction is 50% or more completed, preferably over 90% complete, before temperature of the reduction charge is raised to reach the liquidus of the salt charge and preferably before reaching its solidus temperature level. A solid, coherent but porous, metal skeleton of bridging valve metal particles is thus formed with salt in the pores and the salt's melting in whole or in part does not lead to collapse of the skeleton.

The salt and reducing agent are selected for their ability to produce an exothermic reduction reaction below the salt liquidus and preferably below its solidus.

The heating of the charge for reduction reaction preferably includes a high temperature hold at a temperature preferably above the metal salt mixtures freezing point (liquidus) and in any event above its solidus to redissolve overly fine valve metal particles in the molten salt and reprecipitate such valve metal values on the valve metal skeleton as extensions of nucleating sites formed by the larger highly structured particles therein, which are optimal for use as electrolytic anodes or the like. The elimination in part of fine particles also reduces vulnerability to oxygen contamination.

The reduction reaction takes place in confined conditions which avoid the presence of water, oxygen or other alternative reactants for the reducing agent. However, the reduction reaction charge can be diluted with inert salt to enhance the formation of high structure and high surface area powder. With no dilution at all, there is less surface area of powder produced; but the powder turns out as a low oxygen powder with characteristics which make it especially suitable as what is known in the industry as melting grade or metallurgical grade or sinter grade powder for making mill products and fabricated parts. When dilution is used, the melting of the diluent absorbs energy from the exothermic reaction to stabilize temperature rise rate and the diluent also acts as a barrier to internal pore closing within the metal mass during the time the diluent is solid. The amount of such dilution, if used, is limited only, as a practical matter, by the desire for higher throughput and the danger of introducing oxygen or other contaminants with the diluting material. The diluting materials are selected from the class consisting of alkali metal halide salts.

The source of valve metal metal values to be reduced may be halides of the valve metal, either as single or double salts thereof. The compositions involved are encompassed by the formula: $R_xMH_{x+5}$ where R is one or more of the alkali metals, M is valve metal, preferably tantalum or columbium, H is one or more halogens, but including fluorine alone or in combination with other halogens, $x$ is 0 to 3. The reducing agents are selected from the class consisting of sodium, potassium, lithium, magnesium, aluminum and mixtures, alloys, compounds and amalgams thereof, such as NaK or $NaBH_4$ or $NaAlH_4$.

Preferably—and with distinct advantage—the charge is a mixture of $K_2TaF_7$ diluted with NaCl in a weight ratio of NaCl to $K_2TaF_7$ up to 2.0:1 and the reducing agent is reagent grade sodium, potassium or NaK, preferably sodium. Preferred dilution ratios are in the range of 0.1:1 to 0.5:1.

The $K_2TaF_7$ is provided in a size range of no greater than 10 mesh for a majority of the particles thereof and no greater than 4 mesh in any event, and the NaCl is provided in a size range of no greater than 4 mesh for the majority thereof. Appropriate size limitations will apply to other metal source salts and diluent salts. The particles are charged into a reactor vessel in the proportions above stated. They may be charged in a repeating pattern of alternating layers thereof, or as two discrete masses, or as a mixture. The reactor is sealed and evacuated. The charge is heated to a temperature below the spontaneous ignition temperature for the exothermic reduction reaction and stirred so as to avoid unmixed pockets. This stirring enhances heat transfer and uniformity and also helps dry the charge. In this way water vapor is removed which would otherwise be a troublesome source of oxygen or water in a later stage of the process. After the charge has reached the desired temperature the vacuum is removed and the atmosphere is changed to a slight positive pressure such as 2 lbs. p.s.i.g. of inert gas such as argon or helium. Molten sodium is added to the stirred charge in an amount corresponding to between 95% and 105% of the stoichiometric amount needed for the reduction reaction. The continuing of stirring coats the particles of charge with molten sodium so as to essentially disperse at least 90% of the liquid sodium uniformly through the particulate charge as coating and coating matrix. Stirring is then stopped and heat applied with an external furnace. At around 300° C. the reaction starts and quickly permeates the charge due to the high thermal conductance from the imbued sodium. This exothermic reaction itself is very rapid and results in a nearly adiabatic rise in temperature to between 600° C. and 1000° C. depending on the degree of NaCl dilution. External heating is maintained during the exothermic reaction to attempt to have the reactor wall temperature follow the time temperature profile of the charge. This attenuates the degree of solidification and remelting which might otherwise occur in the course of temperature rise. Temperature of the charge is stabilized in the range of 700–1100° C., for 0.5 to 2 hours. During the rise to the melting point of the salt mixture (over the range 600–900° C. depending on dilution) and during the actual melting process, the reduction reaction initially produces small nucleating particles uniformly dispersed throughout the charge. These particles grow laterally to coalesce with adjacent nucleated particles to form a skeleton metal structure throughout the main mass of slight coherence, which is sufficient to prevent collapse of the metal values into distinct layers, as occurs in stirred reactor, prior art, processes. During the temperature rise period, over 90% of the tantalum values in the salt charge are reduced therefrom and collected in the porous skeletal metal structure. During the high temperature hold some restructuring of the skeleton occurs by mass transfer through the liquid phase to remove ultrafine particles and remaining tantalum values in the salt source are reduced therefrom and added to the skeletal metal structure which remains porous.

After holding at the elevated temperature, unreacted sodium is boiled off and condensed in a separate storage zone, the reactor vessel is cooled to ambient temperature and then opened and the solidified reacted mass intermediate product is chipped out and leached according to prior art procedures known per se to produce powder or other particulate form of the reduced metal.

The resultant tantalum powder product is characterized by a very low Scott Bulk Density [S.B.D.], low oxygen, and coarse particle size, the degrees of which are dependent on dilution and hold temperature and time, but preferably in the range of 20–30 gms./in.$^3$ (1.2–1.8 gm./cc.) S.B.D.; oxygen content of 200 to 2000 parts per million; and a distribution with 60–90% of the total weight of product in the size range of −40 mesh and +5 microns, 1–2% of −5 microns fine particles and the balance of +40 mesh particles. The −325 mesh +5 micron portion of the yield ranges from 25–35%, and has a low Scott Bulk Density which tends to govern the Scott Bulk Density of the yield as a whole. Various particle size cuts of the reduction product could have Fisher Average Particle Diameters (in microns) as follows:

| Size cut | | FAPD, microns |
|---|---|---|
| A | −40 mesh +5 micron | 3.7 |
| B | −100 mesh +5 micron | 3.2 |
| C | −325 mesh +5 micron | 2.4 |

Metal contaminants derived from the vessed are low because the present process does not require stirring at high temperature molten mass in the reaction vessel.

Crush strengths for the A and B fractions described above, when formed into compacts with a green density of 7.0 grams per cubic centimeter by binderless pressing, are over 500 p.s.i. and the crush strength of size cut C similarly formed into a compact is over 300 p.s.i. All of these size fractions can be formed into compacts with binderless pressing having a green density of 5.0 gm./cc. which is resistant to 100 p.s.i. crushing pressure applied to a 1.8 gram cylindrical form compact of 0.25 inch diameter. Flowability characteristics, as determined through Angle of Repose measurements, and specific capacitance by weight and volume of these products approximate the flowability and specific capacitance properties of the commercial SGVR product cited above.

As used herein, the following terms have the following meanings and/or standards.

Mesh size of particles is U.S. standard (rather than Tyler standard) in accordance with specifictaion STP–447A of the American Society for Testing Material [ASTM]. In this specification 325 mesh corresponds to 44 microns. Scott Bulk Density is expressed in grams per cubic inch and measured in accordance with ASTM B329–58T. Angle of Repose is defined in the Dictionary of Geological Terms (American Geological Institute, Doubleday, 1962) as corresponding to the angle between a horizontal plane through a cone vertex and a cone side and is taken with respect to sample tantalum powders poured through a Carney flowmeter funnel, with an agitated tantalum wire arranged centrally in the funnel as a stirrer, into a cup. The pouring is continued until the powder overflows to form a cone. B.E.T. surface area measurement in square cm. per gram is taken according to a modification of the procedure described in the article by Brunauer, Emmet and Teller, 60 Jl. American Chem. Soc'y 309–19 (1938) and Fisher porosity measurements and calculations of FAPD (diameter in microns) and FPR (percent) are in accordance with the article at 12, Jl. Ind'l Engg. Chem. (Anal. Ed'n), 479–482 (1940).

Numerous other objects, features and advantages and uses of the present invention will be apparent to those skilled in the art from the foregoing general description and from the following specific description describing best known modes of practicing and using the invention, and some but not all of the variations thereof, with reference to the accompanying drawings and table inserts in which:

BRIEF DESCRIPTION OF THE DRAWINGS AND INSERTS

DETAILED DESCRIPTION OF PREFERRED EMBODIMENTS OF THE INVENTION

Figure 1:
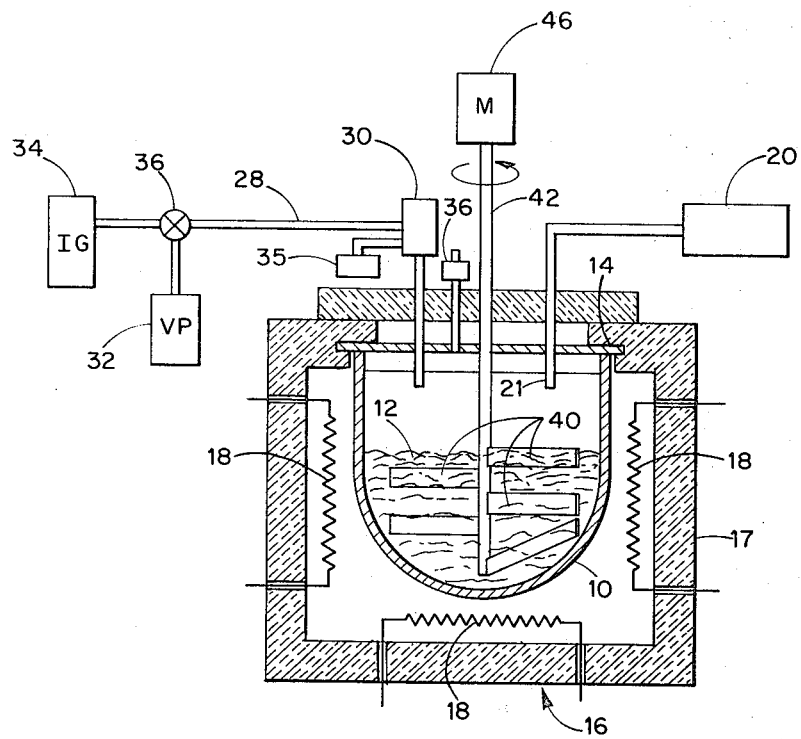
FIG. 1 is a cross-section view of a reactor containing a full charge for the beginning of processing in accordance with the present invention.

Referring now to FIG. 1 there is shown a reactor vessel 10 which is of the general type described in the above cited patent of Hellier et al., with the exception that the side ribs thereof are removed, the stirrer blades 40 are modified to be of low height and afford high shear and that the power of the driving motor is stepped up to allow the stirrer to work solid particles in lieu of the molten mass stirring requirement of the prior device. The vessel has a cover 14. The blades are angled with respect to a diametral vertical plane through the vessel, and all the blades have an aggregate height which occupies a lower half of the vessel where the salt charge is handled. After charge stirring, the blade assembly can be left in the charge or, preferably, lifted out of the charge to occupy the upper half of the vessel and be clear of the charge during subsequent heating thereof and reduction reaction therein. The vessel is in a furnace 16 with heaters 18 and an insulation mantle 17. Sodium is fed from a supply 20 in molten form through port 21. A reflux condenser 30, evacuation line 28, vacuum pump 32, inert gas (e.g. argon) source 34, and valve system 36 are provided for gas handling at various stages of the process. During sodium feed pressure is held at 2 p.s.i.g.

At the end of a cycle, a separate portion of the reflux condenser 30 can be used to condense boiled off unreacted sodium into an auxiliary storage tank 35.

A pressure relief valve 36 in the form of a mercury filled barometric leg, or the like, is provided for venting argon overpressure through bubbling without breaking the hermetic seal of the system during heating.

Figure 2:
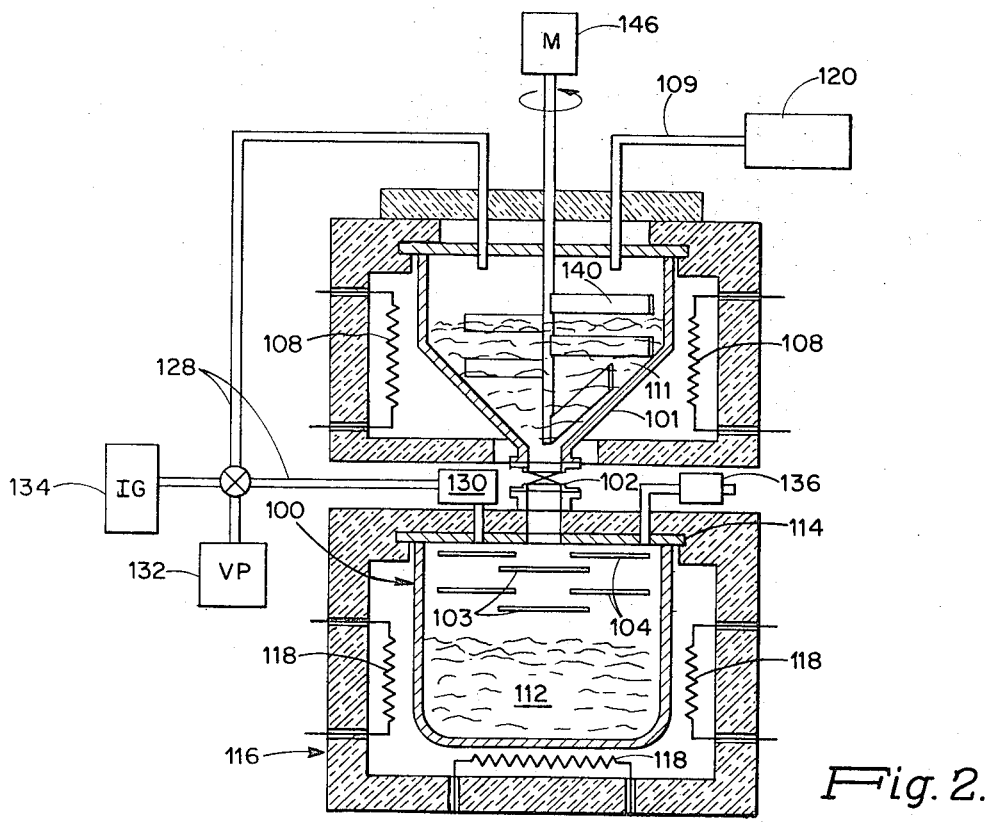
FIG. 2 is a cross-section view of a reactor according to a second embodiment with separate coating and reacting compartments.

FIG. 2 shows a second embodiment of the reactor with separate coating and reaction sections of the vessel. An upper hopper 101 with a motor-driven stirrer paddle 140 therein has a salt charge 111 therein and can utilize a vacuum source 132 and inert gas source 134, via piping 128, and a sodium feed source 109. The upper vessel has a heater 108 for heating it to a maximum of 250° C.

Particles of the salt charge are dried and coated. Then the coated particles are passed through valve 102 into reaction chamber 100 which is (initially or subsequently) surrounded by heaters 118 and insulating walls 116. The reaction charge 112 in vessel 100 can be agitated if necessary for a short time before heat-up by rotating vessel 100 on a turn-table before inserting into a furnace jacket 116/118. The vessel 100 is provided with radiant heat shields and at the end of a reaction, sodium vapor can be pumped out by vacuum pump 132 using the same gas handling apparatus as in the FIG. 1 embodiment. A reflux condenser 130 condenses the sodium for storage in a separate vessel (not shown). The central baffles 103 can be moved aside for salt charge filling. Annular baffles 104 complete the cover array protecting cover 114. Vessel 101 can be made of stainless steel and vessel 100 should be made of Inconel.

Figure 3:
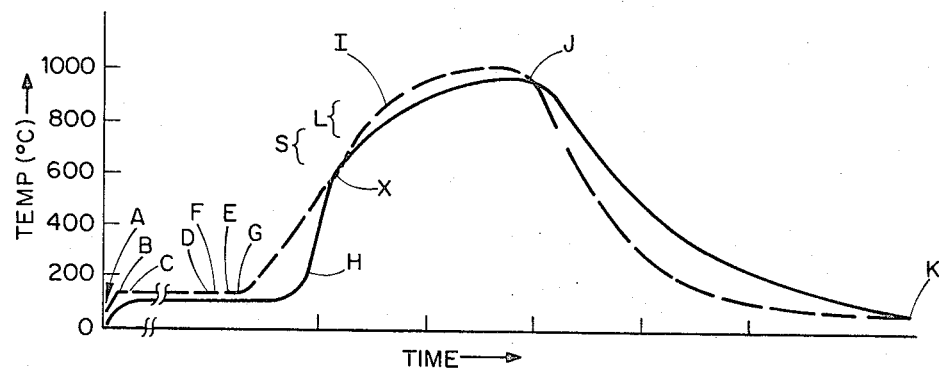
FIG. 3 is a temperature-time plot showing the temperature changes of reactor walls and reduction charge according to a process embodiment hereof.

FIG. 3 is a temperature-time plot of typical reduction run conditions to be prescribed in accordance with the present invention. The solid line curve indicates charge temperature and the dashed line curve, reactor wall temperature. At point A the charge is put into the reactor and stirring and heating begun to thoroughly dry the charge. At B–C, temperature is held at about 100–150° C. while stirring continues to dry the charge. The stirrer is off from C to D, a hold period variable from zero to any convenient time. Molten sodium is added to the charge at D and mixed into the charge. The addition and mixing is carried out slowly and continued from point D to point E when all the sodium has been added. Stirring is carried out from F to G and preferably continued for at least 10 minutes after the last sodium addition. Reactor heating is increased after G and approximately, at point H, the exothermic reduction reaction is initiated, and charge temperature rises rapidly. Charge temperature rises rapidly and passes through the charge solidus and liquidus temperature ranges, which for various possible charges are indicated by S and L, respectively. Power put into the reactor wall heaters is increased at the maximum rate to limit temperature gradient from the charge center to the reactor wall. The molten sodium is highly conductive and transfers heat to the walls. The exothermically driven rise of charge temperature carries charge temperature up to about point X and continuing charge temperature rise is caused by heat transfer thereto from the externally heated reactor walls. Reactor and charge temperatures are stabilized between I and J and held. Then the reactor is cooled between J and K to ambient temperature.

While the exact mechanisms of particle formation are not entirely understood, it is believed that 90% of the tantalum values are reduced from double salt between H and I, and probably below S, and that between I and J, the balance of tantalum values are reduced. From I to J, fine tantalum particles are redissolved in the molten salt bath and reprecipitated as extensions of the skeletal structure of tantalum in the bath made up of linked coarser, highly structured particles.

EXAMPLE 1

635 grams of Na were fused in a 6-inch diameter Inconel reactor vessel located in a laboratory glove box. The vessel was then filled with a particulate salt mixture comprising $K_2TaF_7$ (2167 gm.) of —10 mesh size and particulate NaCl (646 gm.) of —10 mesh which had been intimately premixed outside the vessel by hand stirring. The salt mixture was added slowly to the molten sodium with stirring. The Na/salt mixture temperature was maintained between 100 and 150° C. during mixing. After the salt particles were thoroughly coated with sodium, the vessel was sealed and transferred to a furnace. The charge was heated to about 300° C. at which temperature the exothermic reaction was initiated.

The temperature of the reaction products rapidly rose to 900° C., as measured by an inserted thermocouple. The reactor walls were simultaneously being rapidly heated by the furnace, the objective being to have the wall temperature not lag the charge temperature or to minimize such lag. The charge temperature was stabilized in the range of 950–1050° C., and held for one hour. The reactor was cooled to room temperature in ambient air, opened and the reaction products were crushed, leached and classified to produce tantalum powder. The powder yields of this and a similar experiment [lumped to provide testing quantities] were classified and tested in various size fractions. The corresponding porosity and Scott Bulk Density of such powders are given in Table 1. The fractions are identified as (1), (2) and (3). Powder samples of the various fractions were pressed into ¼ inch diameter 1.8 gram compacts of 6.0 and 7.0 gram/cc. green density which had crush strengths as indicated in Table 1.

Fractions (1) and (2) had the capability of forming 7.0 gram/cm.³ green density compacts with crush strengths of 500 p.s.i. The 6.0 gram green density compacts of the various fractions were sintered at 1600° C., 1700° C., 1800° C., 1900° C. for 30 minutes. The resultant anodes were formed to 100 volts and wet tested in accordance with the procedures described in Example 2 below.

TABLE 1A—EXAMPLE 1

| Fraction | Yield (wt. percent of theoretical) | Porosity | | SBD, gm./in.³ | Crush strength (p.s.i.) | | Percent shrinkage at— | |
|---|---|---|---|---|---|---|---|---|
| | | FAPD, microns | FPR, percent | | Dg=6.0 gm./cc. | Dg=7.0 gm./cc. | 1,600° C. | 1,900° C. |
| 1 —40 mesh +5 microns | 80 | 3.6 | 82 | 27 | 270 | 560 | 5 | 13 |
| 2 —100 mesh +5 microns | 57 | 3.1 | 81 | 29 | 260 | 510 | 6 | 12 |
| 3 —325 mesh +5 microns | 32 | 2.4 | 80 | 27 | 120 | 350 | 8 | 16 |

Figure 4:
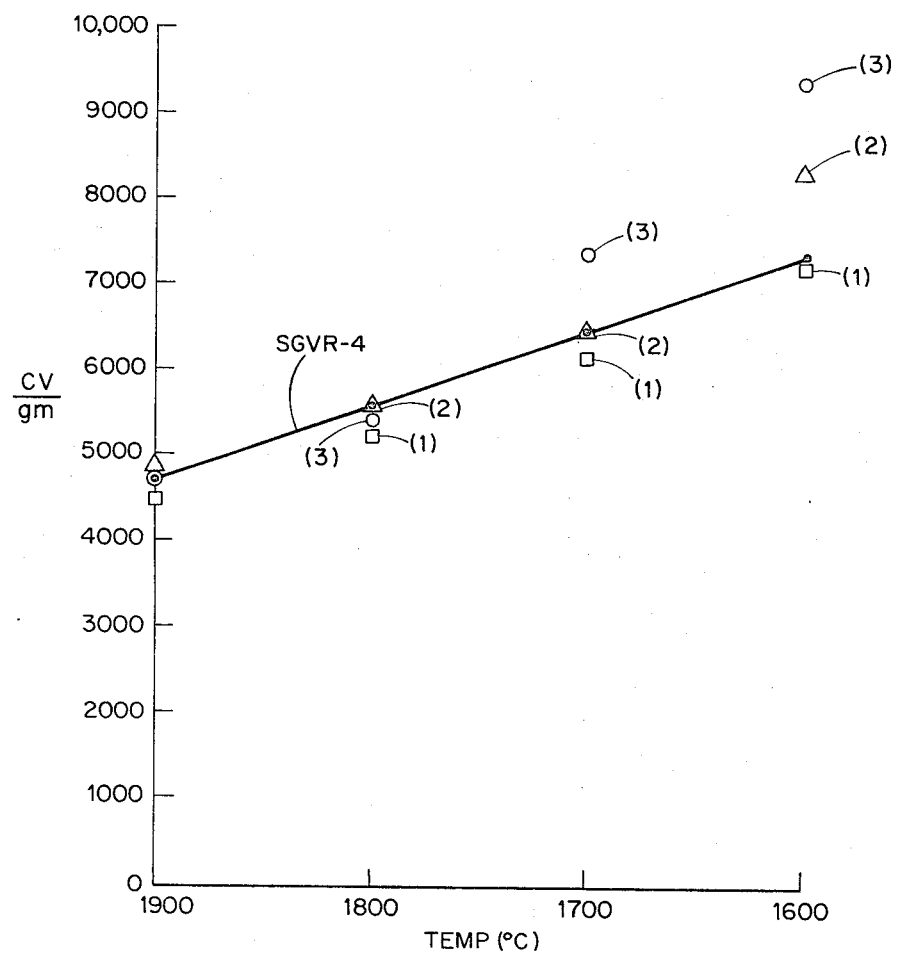
FIG. 4 is a plot of specific capacitance values of anodes formed as described in the Examples thereof, compared with SGVR data.

The specific capacitances (microfarad-volts per gram) of the various anodes identified by their particle fraction numbers (1) (2) and (3) are plotted in FIG. 4 for the various sinter temperatures involving overlying a line marked SGVR–4 which indicates corresponding results for the commercial product SGVR–4 when tested under similar conidtions. Shrinkages (volume percentages) of the sintered compacts at 1600° C. and 1900° C. are given in Table 1.

EXAMPLE 2

A reactor vessel, as shown in FIG. 1, was charged with 108.4 lb. of $K_2TaF_7$, 48.4 lb. of NaCl and heated to the point that the reactor walls were at 350° C. temperature and the charge temperature was about 200–300° C. The charge was under vacuum (less than 500 microns pressure) during the heating. The contents were stirred during this heating. This charge temperature range was held for 1 hour with stirring. Then the vessel was back-filled with argon to a pressure of 10 mm. Hg above atmospheric pressure. Then, while holding temperature and continuing stirring, 10 lb. of molten sodium were added over the course of 5 minutes. This mixture was stirred for five more minutes. 20.8 lb. of additional molten Na were then added over 10 minutes with continued stirring. The stirrer was turned off 2 minutes later. The furnace and charge were rapidly heated to 950° C. where the charge temperature was thus held for 1.0 hours. The vessel was then cooled by amient air cooling for a day. The vessel was then opened and the solid reduction products comprising $K_2TaF_7$, NaCl, KCl, NaF, Ta were chipped out, milled and leached in accordance with conventional practice of the art. A 94% yield of the theoretical weight of tantalum was obtained.

The tantalum powder produced from this metal had the size ranges given in Table 2A below. Its —40M +5µ fraction had the Fisher porosity ratings and Scott Bulk Density indicated in Table 2B and the chemical impurities listed in Table 2C. The powder fraction was pressed to 6.0 gm./cc. green density 1.6 gram anodes of ¼ inch diameter and sintered at 1650° C. and formed to 100 volts in 0.1% $H_3PO_4$ solution at 92° C. The anodes were wet tested in 30% (by vol.) $H_2SO_4$ at 70 v. for D.C. leakage and at 0.5 v. A.C. (120 c.p.s.) for capacitance and dissipation. The measured and calculated electrical characteristics thereof are given in Table 2B.

TABLE 2A

Powder Fraction Yield (Weight Percent) for Example 2

| Powder fraction: | Weight percent |
|---|---|
| +12M | .20 |
| −12M +40M | 2.8 |
| −40M +60M | 2.7 |
| −60M +100M | 5.2 |
| −100M +325M | 32.4 |
| −325M +5µ | 56.2 |
| −5µ +0µ | 0.5 |

TABLE 2B

Physical and Electrical Properties of −40M +5µ Fraction (96.5 w/o) for Example 2

| Powder: | Anodes: |
|---|---|
| FAPD (µ) | 4.7 |
| PR (percent) | 78.8 |
| SBD (g./cc.) | 39.6 |
| $L(\mu_a/g)$ | 16.4 |
| $L/C(\mu_a/\mu_f)$ | .22 |
| $C(\mu_{f/g})$ | 74.7 |
| DF (percent) | 11.2 |
| ESR (ohm) | 1.99 |

TABLE 2C

Chemical Analysis of −40M +5µ Fraction for Example 2

| Element: | P.p.m. |
|---|---|
| Al | <10 |
| Ca | 75 |
| Cr | 65 |
| Cu | <1 |
| Fe | 55 |
| Mg | 7 |
| Mn | <1 |
| Ni | 29 |
| Si | <10 |
| $O_2$ | 886 |
| $N_2$ | 42 |

EXAMPLE 3

A reactor vessel, as shown in FIG. 1, was charged with 108.4 lb. of $K_2TaF_7$, 48.4 lb. of NaCl, mixed by stirring and then heated to about 100° C. while vacuum pumping on the vessel and without stirring during the heat-up. Then the vessel was back-filled with argon to a pressure of 10 mm. Hg above atmospheric pressure. Then 10 lb. of molten sodium was added over the course of 2 minutes with the charge at about 100° C. Then the stirrer was initiated while adding an additional 20.8 lb. sodium over the course of 3 minutes. Stirring was continued for 5 more minutes after sodium addition. Then the stirrer was turned off. The furnace was then set for 950° C., to increase the temperature of the reaction mixture. A rapid rise in temperature to 500° C., indicative of an exothermic reaction, occurred when the reaction mass reached 270° C.; as measured by a thermocouple placed in the reaction mass and adjacent to the reactor wall. Charge temperature was brought to 950° C. and held for 1.0 hours. A 92% yield of the theoretical weight of tantalum was obtained.

The tantalum powder produced from this metal had the size ranges given in Table 3A, powder physical properties given in Table 3B and impurity levels given in Table 3C, and (when pressed into anodes and processed as in Example 2) the electrical properties given in Table 3B below.

TABLE 3A

Powder Fraction Yield (Weight Percent) for Example 3

| Powder: | Anodes |
|---|---|
| +12M | .20 |
| −12M +40M | 10.9 |
| −40M +60M | 10.5 |
| −60M +100M | 11.9 |
| −100M +325M | 27.7 |
| −325M +5µ | 37.3 |
| −5µ | 1.5 |

TABLE 3B

Physical and Electrical Properties of −40M +5µ Fraction (88.9 w/o) for Example 3

| Powder: | Anodes: |
|---|---|
| FAPD(µ) | 3.0 |
| FPR (percent) | 80 |
| SBD (g./cc.) | 28.3 |
| $L(\mu_a/g)$ | 14.6 |
| $L/C(\mu_a/\mu_f)$ | .20 |
| $C(\mu_{f/g})$ | 73.1 |
| DF (percent) | 11.2 |
| ESR (ohm) | 2.03 |

TABLE 3C

Chemical Analysis for −40M +5 Fraction for Example 3

| Element: | P.p.m. |
|---|---|
| Al | <10 |
| Ca | 80 |
| Cr | 11 |
| Cu | 5 |
| Fe | 18 |
| Mg | 5 |
| Mn | <1 |
| Ni | 25 |
| Si | 20 |
| $O_2$ | 3172 |
| $N_2$ | 50 |
| $H_2$ | 323 |
| C | 147 |

EXAMPLE 4

A number of reaction initiation and power cut off runs were made with processing as in Example 1, save the external heating was cut off upon initiation of the exothermic reaction (as indicated by a temperature rise rate of 30° C. per/10 seconds, or faster). In adding NaCl and $K_2TaF_7$ to the molten-sodium-containing crucible, the NaCl was added first and stirred in and $K_2TaF_7$ was added second and stirred in. Both NaCl and $K_2TaF_7$ were preheated to over 100° C. before adding.

These runs were at various dilution weight ratios of NaCl:$K_2TaF_7$ and reached respective initiation temperatures (Ti), maximum temperatures (Tm) and yielded, after leaching their reduction products, total tantalum yields [$Y_T$, given in weight percent in relation to theoretical maximum yield] and yields of minus 40 mesh, plus 5 micron powder [Y405] as shown in Table 4A. In each case, about 10–25 w/o of yield was in the minus 5 micron size range.

A further series of similar runs was made without cutting off furnace power and with elevated temperature holds (hold temperatures $T_H$ for times $t$) as shown in Table 4B giving $Y_T$ and Y4015 as shown.

The runs with high temperature hold increased −40 +5 yield compared to the runs without holds.

TABLE 4A—EXAMPLE 4

| Dilution ratio (w/o) | Ti (° C.) | Tm (° C.) | $Y_T$ (w/o) | $Y_{40/5}$ (w/o) |
|---|---|---|---|---|
| .298 | 335±35 | 900±10 | 96.0 | 72.9 |
| .597 | 365±20 | 825±20 | 93.4 | 66.2 |
| 1.342 | 315±30 | 725±5 | 93.7 | 66.7 |

TABLE 4B—EXAMPLE 4

| Dilution ratio (w/o) | $T_H$, ° C. | t (min.) | $Y_T$ | $Y_{40/5}$ |
|---|---|---|---|---|
| .298 | 1,050 | 30 | 97.8 | 88.3 |
| .597 | 1,050 | 30 | 96.6 | 77.2 |
| 1.342 | 1,050 | 30 | 97.0 | 73.2 |
| .298 | 1,050 | 60 | 97.2 | 88.4 |
| .547 | 1,050 | 60 | 97.3 | 77.9 |
| 1.342 | 1,050 | 60 | 97.4 | 73.1 |
| .298 | 1,050 | 240 | 98.3 | 90.0 |
| .547 | 1,050 | 240 | 98.6 | 78.1 |
| 1.342 | 1,050 | 240 | 96.8 | 67.2 |

It is evident that those skilled in the art may now make numerous uses and modifications of, and departures from the specific embodiments described herein without de-

What is claimed is:

1. A process for making powders of a metal selected from the class consisting of tantalum and columbium from metal salt comprising chemically reducing a particulate charge of a halide salt, a majority of particles of which are minus 10 mesh of said metal with a reducing agent in an exothermic reduction reaction, utilizing a salt with a liquidus line above the initiation temperature for said exothermic reaction and a reducing agent selected from the class consisting of sodium, potassium, lithium, magnesium, aluminum and mixtures, alloys, compounds and amalgams thereof with a melting temperature below said salt liquidus, coating said salt with molten reducing agents, heating the coated particles to initiate said exothermic reaction and forming porous valve metal skeleton during a period of essentially adiabatic temperature rise of the exothermic reduction process, the skeleton having nucleating valve metal sites dispersed throughout the charge, the skeleton being formed to a coherent state while the salt charge temperature is below the liquidus temperature level of the salt charge.

2. Process in accordance with claim 1 wherein the salt charge is coated with at least part of the total amount of reducing agent to be used prior to initiating said exothermic reaction and the said reducing agent coats the salt particles.

3. Process in accordance with claim 2 wherein the salt charge is coated with all the reducing agents prior to initiating the exothermic reaction initiation.

4. Process in accordance with claim 2 wherein, the reducing agent and charge are stirred during said coating and after said heating of the coated particles to a temperature above the exothermic reaction initiation temperature.

5. The process of claim 1 further comprising adding an inert diluent salt to the charge.

6. Process in accordance with claim 5 wherein, said diluent salt is also coated with reducing agent, the total weight of reducing agent coating both said salt species being within the range of 90–105% of stoichiometric quantity for reducing all the metal contained in the valve metal salt source.

7. Process in accordance with claim 1 wherein, the said valve metal containing salt is potassium fluotantalate and the reducing agent is sodium.

8. Process in accordance with claim 1 wherein, the charge/reduction-agent mass is further heated above its solidus.

9. Process in accordance with claim 8 wherein, the charge/reduction-agent mass is further heated above its liquidus.

10. Process in accordance with claim 8 wherein, said further heating includes a hold of temperature of about 700–1100° C. for at least about 0.5 hours so as to dissolve fine metal particles in molten salt within the skeleton to transport tantalum values to nucleating sites in the skeleton and recrystallized tantalum at said sites.

11. Process in accordance with claim 1 wherein, reducing agent in excess of 100% of stoichiometric quantity for the complete reduction of valve metal values in the charge is used and remaining reducing agent is boiled off at completion of the process.

12. Process in accordance with claim 1 wherein, the salt charge comprises $R_xTaF_{x+5}$ where R is an alkali metal and $x$ is 0 to 3.

13. Process for making capacitor grade tantalum powder from potassium fluotantalate in accordance with claim 12 comprising the steps of forming a dried charge of said fluotantalate in a mixing vessel, adding a reducing agent selected from the class consisting of sodium, potassium, and alloys thereof, to said vessel and agitating the vessel contents at a temperature between the melting point of the reducing agent and 300° C. therein, heating the mixture in a reaction vessel above 300° C.

14. Process in accordance with claim 13 wherein, the reducing agent is sodium.

15. Process in accordance with claim 13 wherein, said coating is carried out in a first vessel and the charge is thereafter transferred to a second vessel and heated in said second vessel to initiate said reaction.

16. Process in accordance with claim 13 wherein, a diluent selected from the class consisting of sodium chloride, potassium chloride, sodium fluoride, potassium fluoride and mixtures thereof salt is added to said charge.

17. Process in accordance with claim 16 wherein, the quantity of diluent is such that the weight ratio of diluent to potassium fluotantalate is no greaer han 2.0:1.

18. Process is accordance with claim 17 wherein, said ratio is no greater than 0.5:1.0.

19. Process in accordance with claim 16 wherein, said diluent is in the form of −10 mesh average size particles and all the said diluent and fluotantalate salt particles are coated with sodium, the total quantity of all sodium in the reactor vessel being within 90—105% of stoichiometric quantity for freeing all tantalum in said fluotantalate salt in the reactor vessel.

References Cited

UNITED STATES PATENTS

| | | | |
|---|---|---|---|
| 2,950,185 | 8/1960 | Hellier | 75—.5 BB |
| 3,031,295 | 4/1962 | Keller | 75—84.4 |
| 3,647,415 | 3/1972 | Yano | 75—.5 BB |
| 3,748,106 | 7/1973 | Davis | 75—.5 BB X |

FOREIGN PATENTS

| | | | |
|---|---|---|---|
| 14,880 | 4/1961 | Japan | 75—84.4 |
| 12,221 | 12/1962 | Japan | 75—84.4 |

L. DEWAYNE RUTLEDGE, Primary Examiner

A. J. STEINER, Assistant Examiner

U.S. Cl. X.R.

75—84.4